(12) United States Patent
Benson

(10) Patent No.: US 12,528,361 B2
(45) Date of Patent: Jan. 20, 2026

(54) ELECTRIC VEHICLE SOLAR POWER SYSTEM

(71) Applicant: Jason Benson, Hollister, CA (US)

(72) Inventor: Jason Benson, Hollister, CA (US)

( * ) Notice: Subject to any disclaimer, the term of this patent is extended or adjusted under 35 U.S.C. 154(b) by 488 days.

(21) Appl. No.: 18/079,329

(22) Filed: Dec. 12, 2022

(65) Prior Publication Data

US 2024/0190256 A1   Jun. 13, 2024

(51) Int. Cl.
| | |
|---|---|
| *B60L 8/00* | (2006.01) |
| *B60L 50/60* | (2019.01) |
| *B62D 33/04* | (2006.01) |
| *B62D 33/08* | (2006.01) |
| *H02S 10/20* | (2014.01) |
| *H02S 10/40* | (2014.01) |

(52) U.S. Cl.
CPC ............... *B60L 8/003* (2013.01); *B60L 50/66* (2019.02); *B62D 33/04* (2013.01); *B62D 33/08* (2013.01); *H02S 10/20* (2014.12); *H02S 10/40* (2014.12)

(58) Field of Classification Search
CPC .... B60L 8/003; B60L 8/53; B60L 8/60; B60L 8/66; B60L 8/90; H02S 10/20; H02S 10/40; B62D 33/04; B62D 33/08
See application file for complete search history.

(56) References Cited

U.S. PATENT DOCUMENTS

| | | | |
|---|---|---|---|
| 4,592,436 A | 6/1986 | Tomei | |
| 7,493,974 B1 | 2/2009 | Boncodin | |
| D639,208 S | 6/2011 | Li | |
| 8,220,569 B2 | 7/2012 | Hassan | |
| 9,004,571 B1 | 4/2015 | Bernardo | |
| 9,440,525 B1* | 9/2016 | Baty | B60H 1/00428 |
| 9,944,186 B1* | 4/2018 | Rehberger | B60L 50/51 |
| 12,083,875 B2* | 9/2024 | Pattabhiraman | B60J 7/068 |
| 2008/0100258 A1* | 5/2008 | Ward | H01M 10/465 |
| | | | 320/101 |
| 2011/0260470 A1 | 10/2011 | Ahmadi | |
| 2013/0335002 A1 | 12/2013 | Moore | |
| 2023/0173928 A1* | 6/2023 | White, III | H02S 10/40 |
| | | | 320/109 |
| 2023/0402665 A1* | 12/2023 | Han | H02J 7/35 |

* cited by examiner

*Primary Examiner* — John D Walters

(57) ABSTRACT

An electric vehicle solar power system for converting solar radiation into electricity from a solar panel mounted on a hood of a vehicle including a vehicle body including a front end compartment and a hood covering the front end compartment. An electric motor is operatively coupled to the vehicle body, and a battery is electrically coupled to the electric motor. A front solar panel is attached to and faces upwardly from the hood. The front solar panel is electrically coupled to the battery and is configured for converting solar radiation into electricity to charge the battery.

15 Claims, 9 Drawing Sheets

ELECTRIC VEHICLE SOLAR POWER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to electric vehicle solar power systems and more particularly pertains to a new electric vehicle solar power system for converting solar radiation into electricity from a solar panel mounted on a hood of a vehicle.

(2) Description of Related Art Including Information Disclosed Under 37 CFR 1.97 and 1.98

The prior art relates to electric vehicle solar power systems which comprise solar panels for charging batteries on electric vehicles. The prior art discloses systems which position solar panels on the hood or roof of a vehicle and those which charge auxiliary batteries for use as backup power sources to a main battery.

BRIEF SUMMARY OF THE INVENTION

An embodiment of the disclosure meets the needs presented above by generally comprising a vehicle body including a front end compartment and a hood covering the front end compartment. An electric motor is operatively coupled to the vehicle body, and a battery is electrically coupled to the electric motor. A front solar panel is attached to and faces upwardly from the hood. The front solar panel is electrically coupled to the battery and is configured for converting solar radiation into electricity to charge the battery.

A bed cover is positioned on and extends between the upper edges of the pair of side panels such that the bed cover is positioned vertically spaced above the floor panel. A bed solar panel configured for converting solar radiation into electricity is attached to the bed cover and faces upwardly from the bed cover. A battery is electrically coupled to the electric motor and the bed solar panel. The bed solar panel is configured for charging the battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
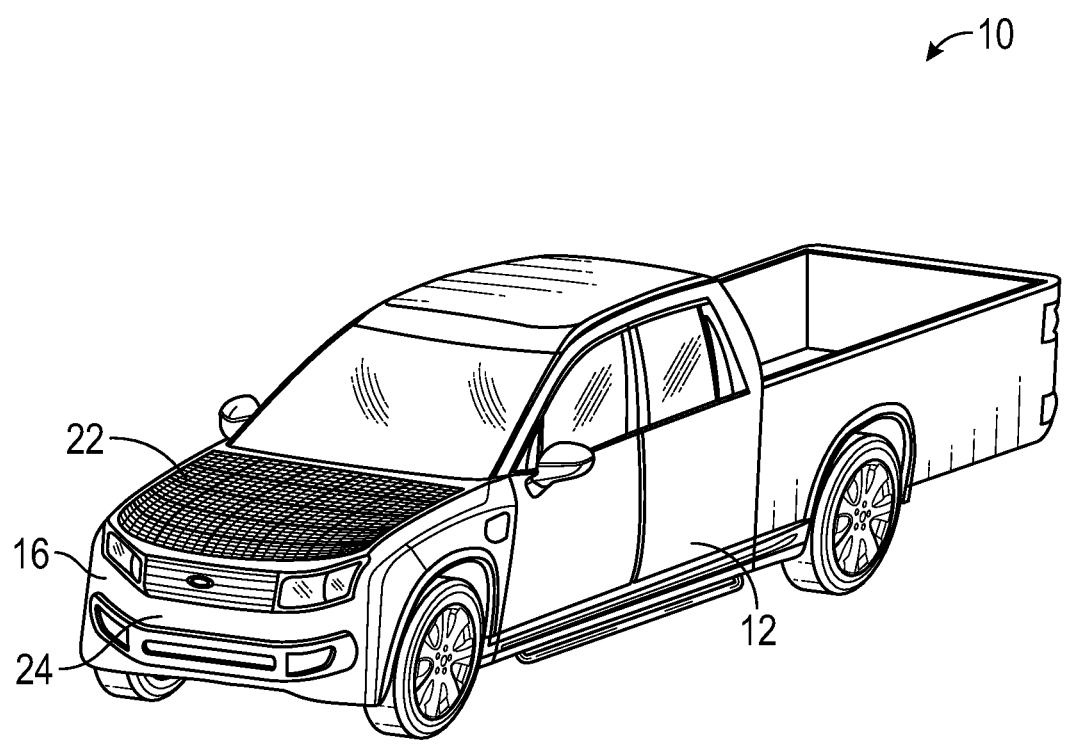
FIG. 1 is a perspective view of an electric vehicle solar power system according to an embodiment of the disclosure.
Figure 2:
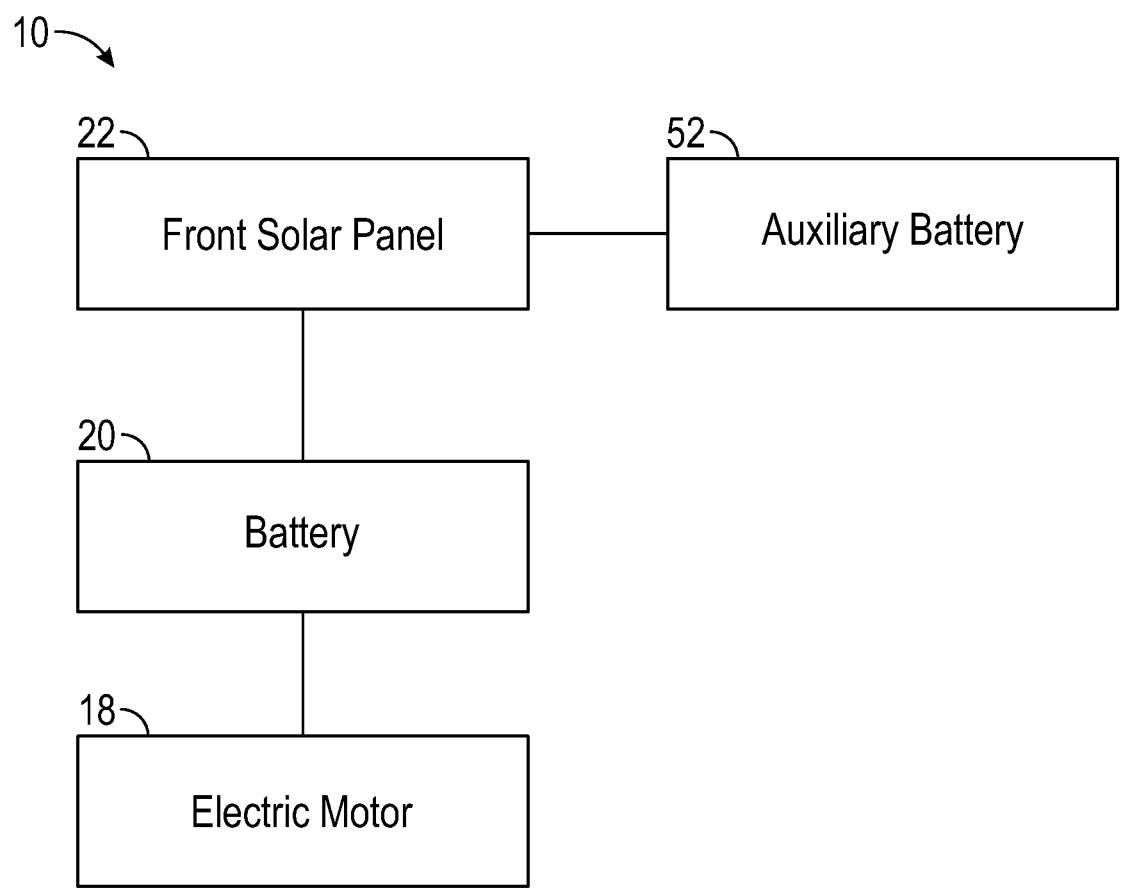
FIG. 2 is a block diagram of an embodiment of the disclosure.
Figure 3:
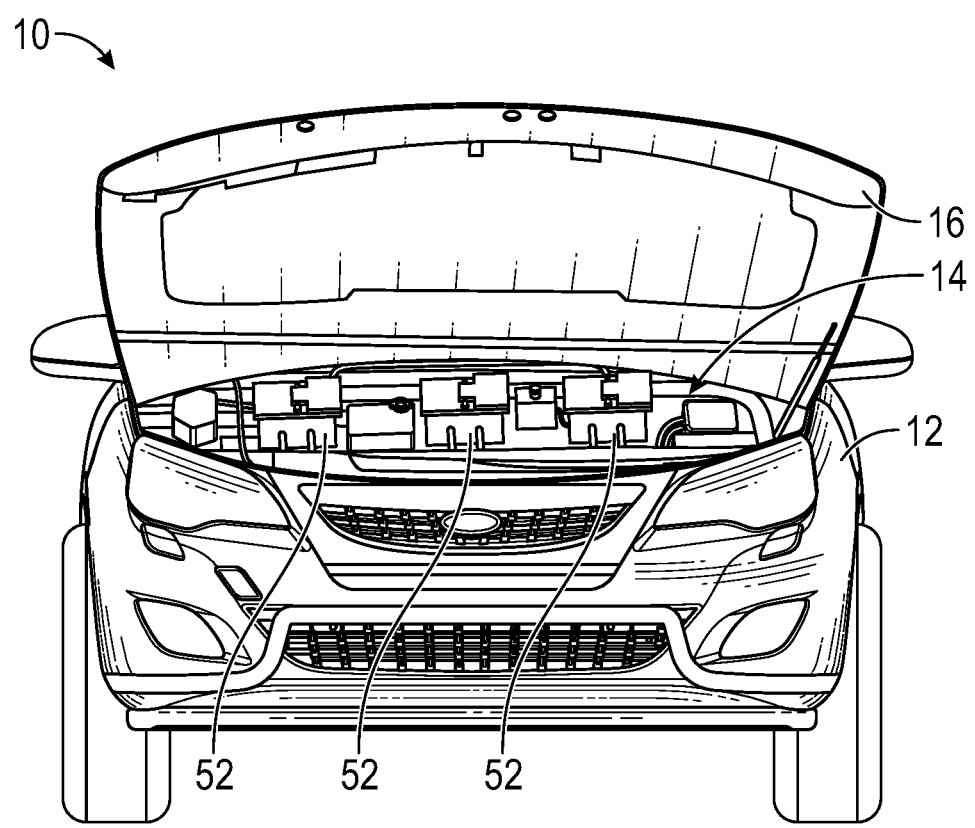
FIG. 3 is a front view of an embodiment of the disclosure with a pickup truck body.
Figure 4:
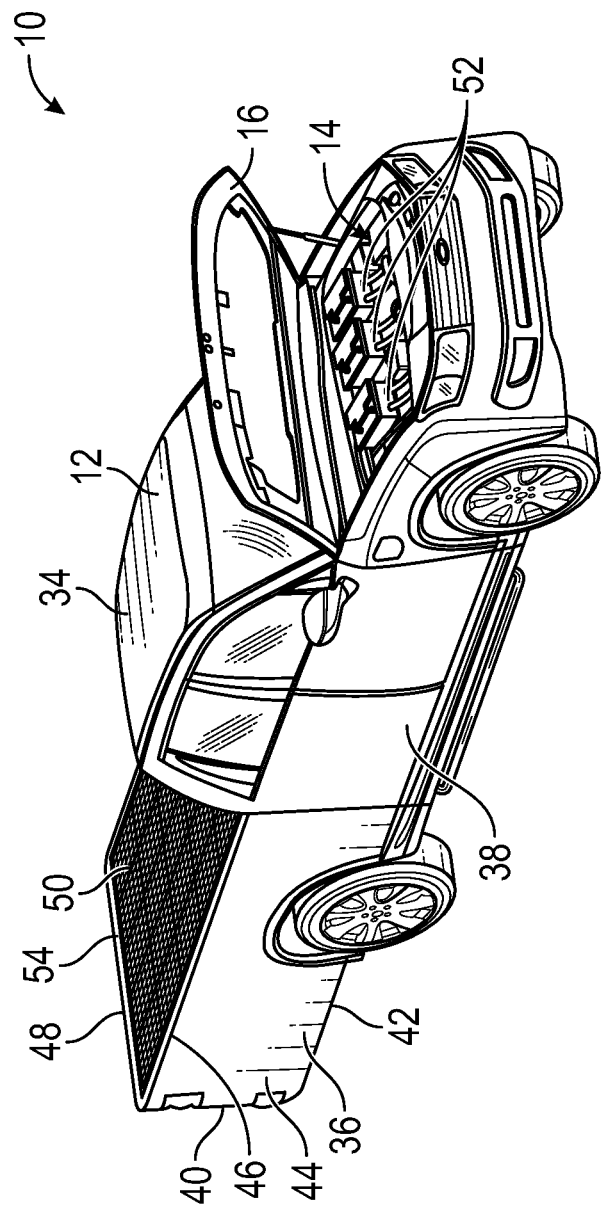
FIG. 4 is a perspective view of an embodiment of the disclosure with a pickup truck body.
Figure 5:
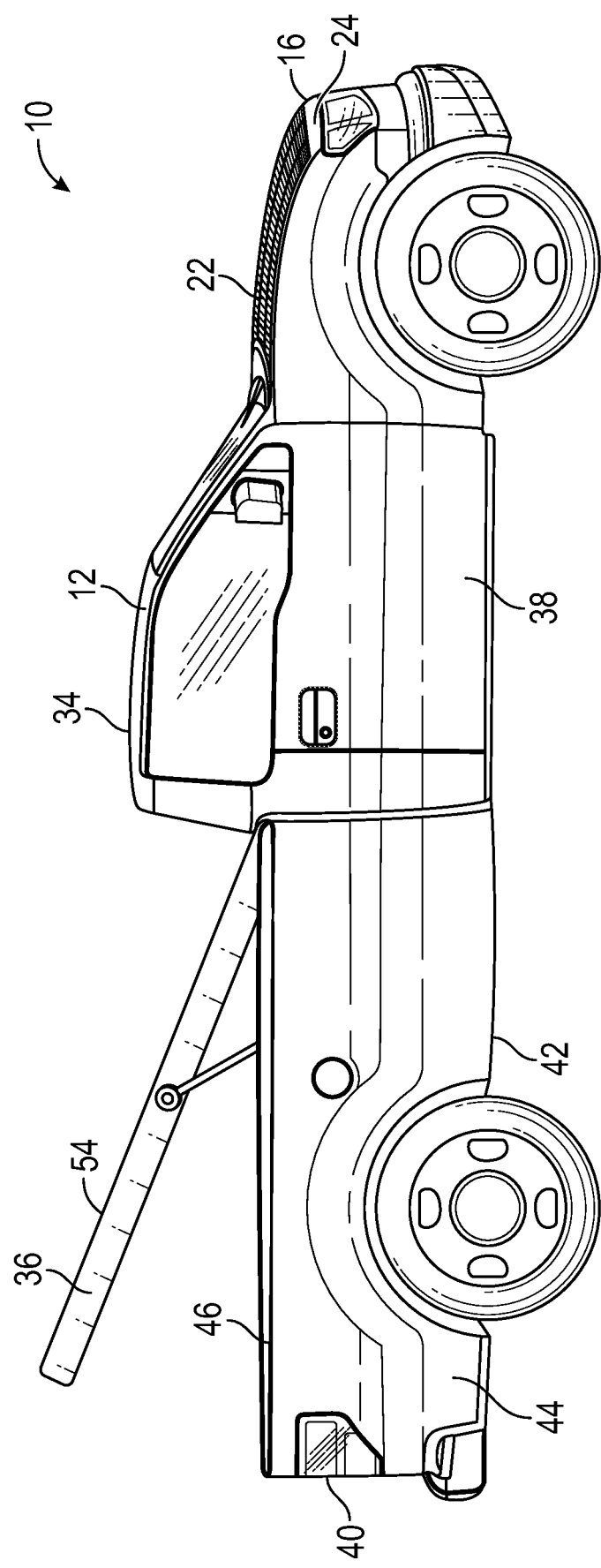
FIG. 5 is a side view of an embodiment of the disclosure with a pickup truck body.
Figure 6:
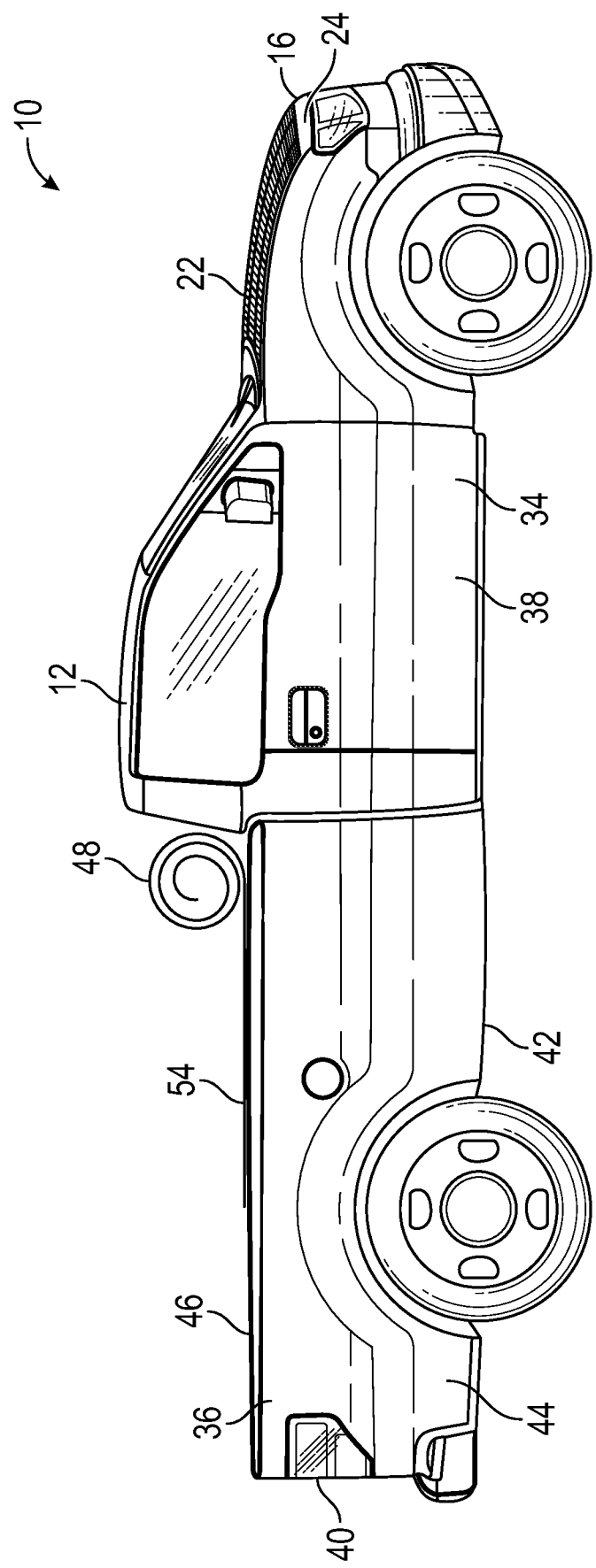
FIG. 6 is a side view of an embodiment of the disclosure with a pickup truck body.
Figure 7:
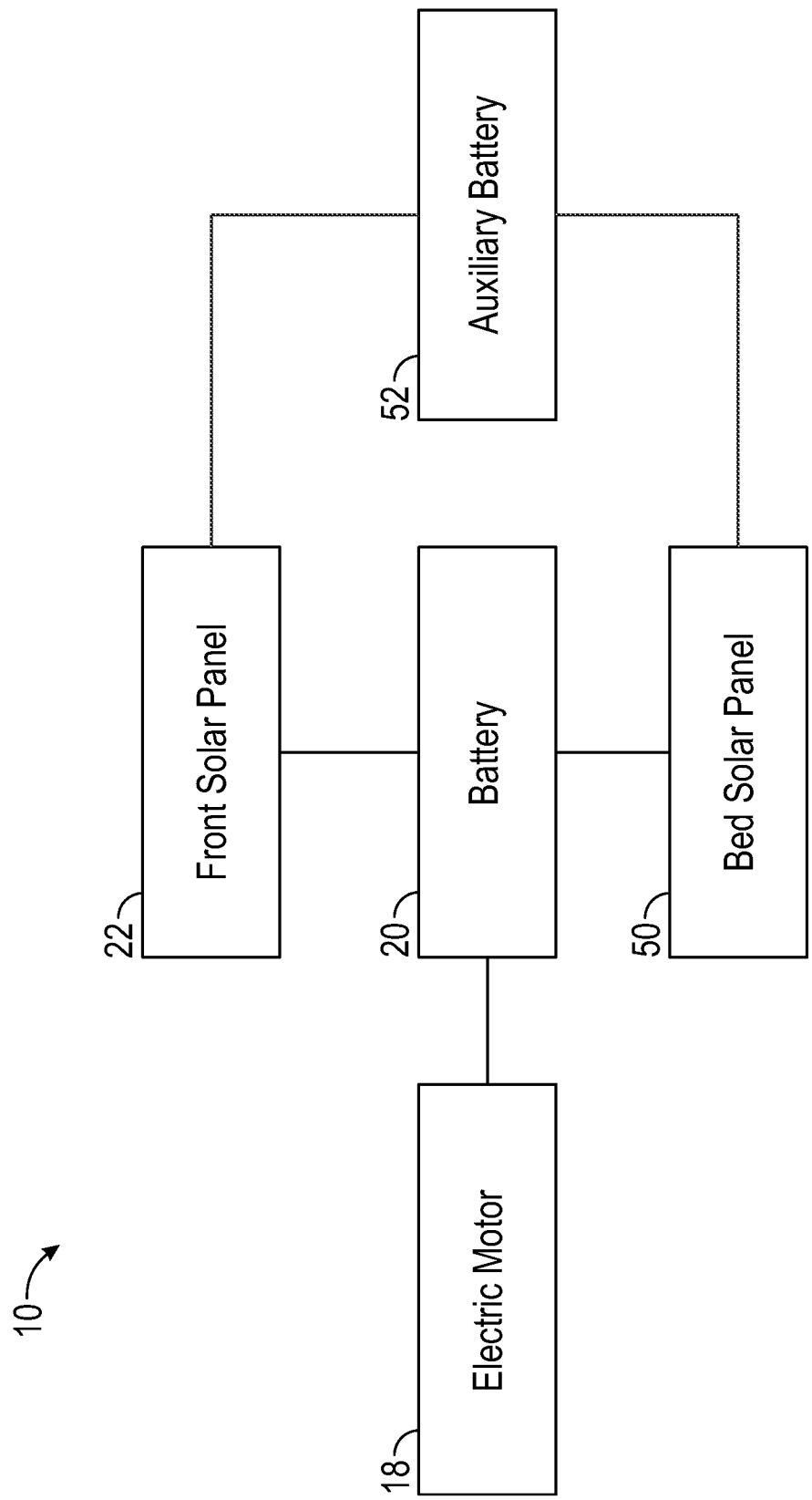
FIG. 7 is a block diagram of an embodiment of the disclosure with a pickup truck body.
Figure 8:
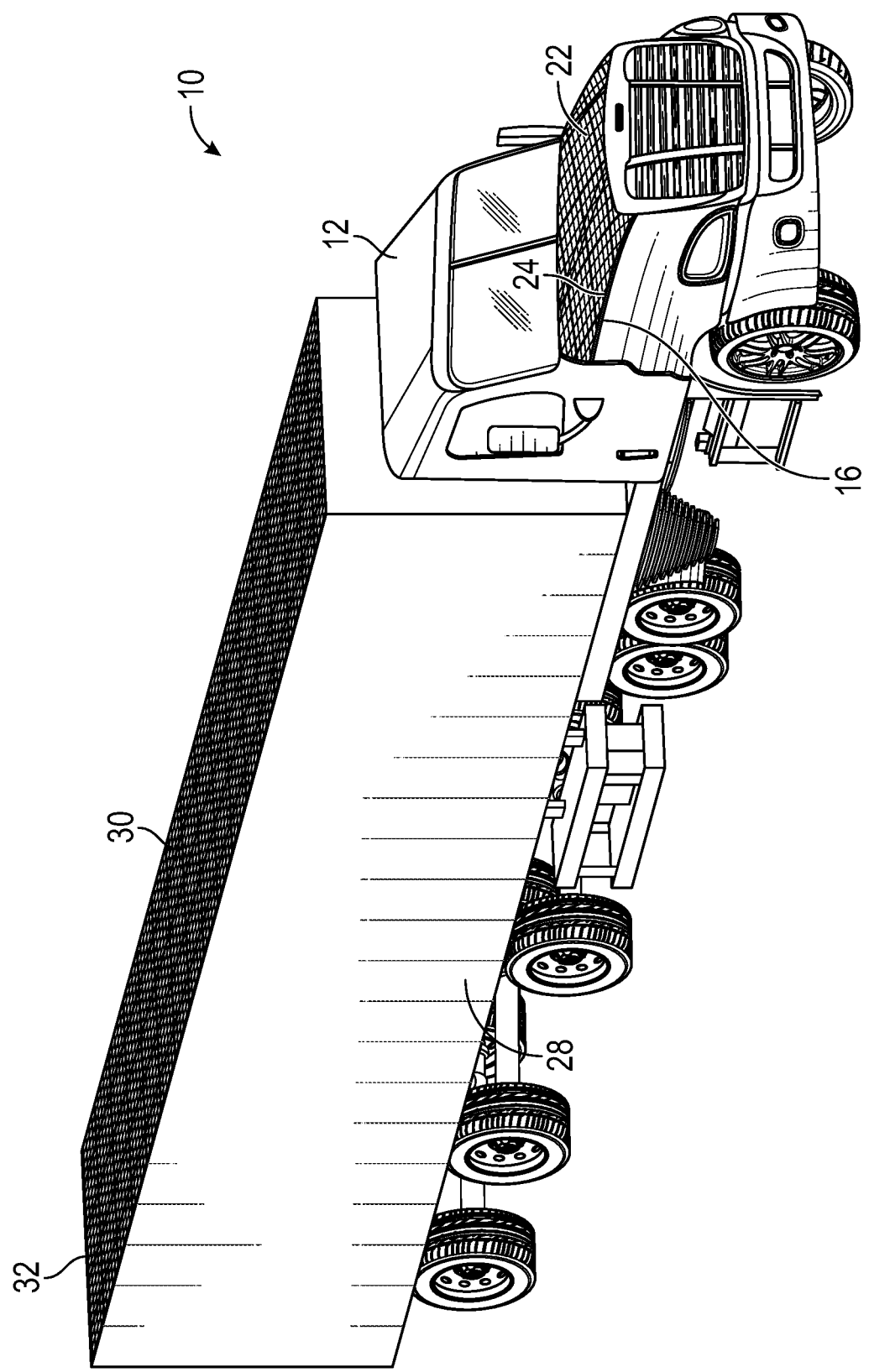
FIG. 8 is a perspective view of an embodiment of the disclosure with a semitruck body.
Figure 9:
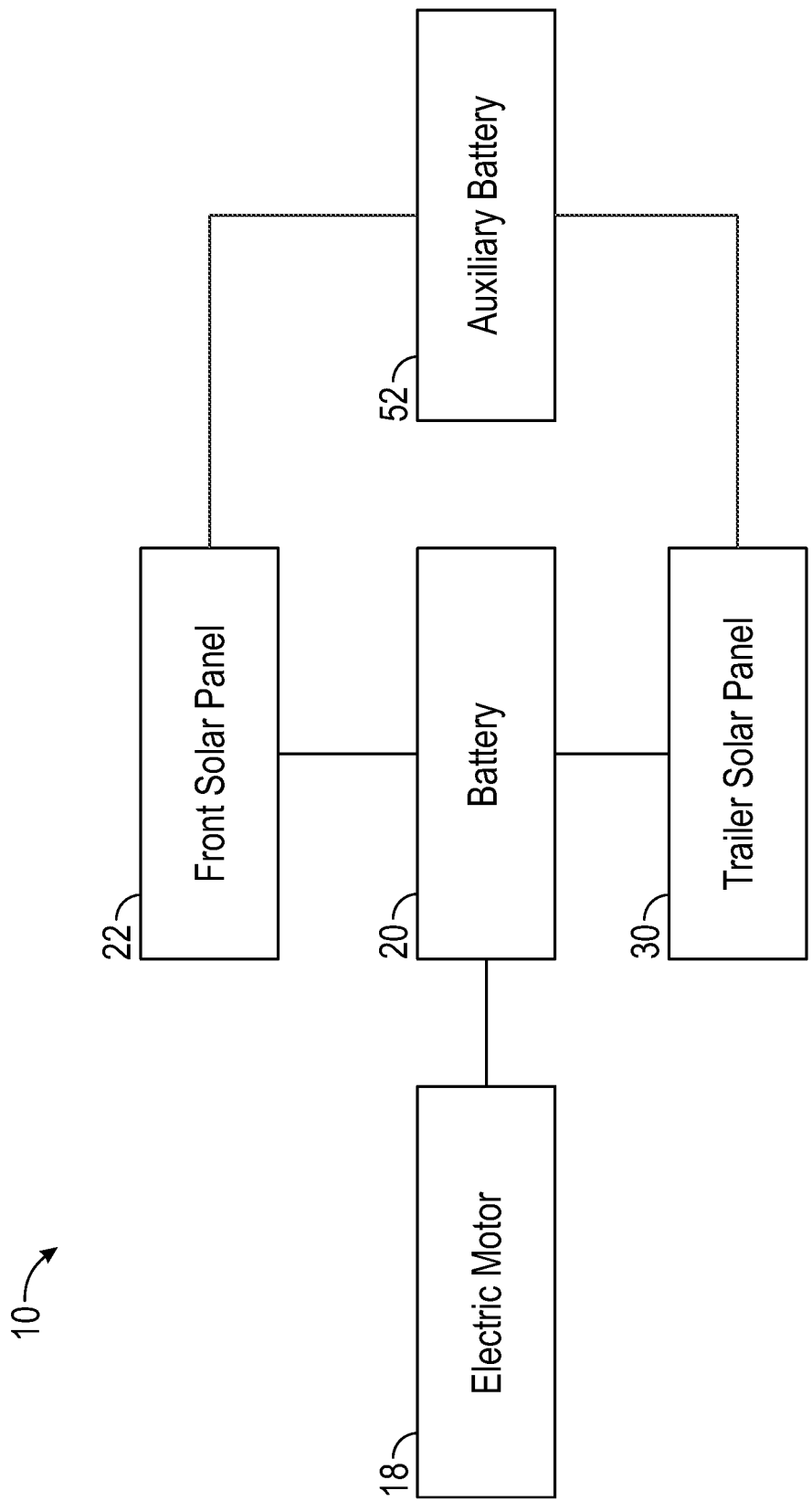
FIG. 9 is a block diagram of an embodiment of the disclosure with a semitruck body.

With reference now to the drawings, and in particular to FIGS. 1 through 9 thereof, a new electric vehicle solar power system embodying the principles and concepts of an embodiment of the disclosure and generally designated by the reference numeral 10 will be described.

As best illustrated in FIGS. 1 through 9, the electric vehicle solar power system 10 generally comprises a vehicle body 12 including a front end compartment 14 and a hood 16 covering the front end compartment 14. An electric motor 18 is operatively coupled to the vehicle body 12, and a battery 20 is electrically coupled to the electric motor 18. A front solar panel 22 is attached to and faces upwardly from the hood 16. The front solar panel 22 is electrically coupled to the battery 20 and is configured for converting solar radiation into electricity to charge the battery 20. The front solar panel 22 covers greater than 90% of an upper surface 24 of the hood 16.

In some embodiments, the vehicle body 12 defines a semitruck body 26 which tows a trailer 28. A trailer solar panel 30 is coupled to and faces upwardly from the trailer 28. The trailer solar panel 30 is also electrically coupled to the battery 20 and is configured for converting solar radiation into electricity to charge the battery 20. The trailer solar panel 30 covers greater than 90% of a top surface 32 of the trailer 28.

In other embodiments, the vehicle body 12 defines a pickup truck body 34 including a pickup bed 36. The pickup truck body 34 also includes a cab 38 which is positioned between the front end compartment 14 and the pickup bed 36. The pickup bed 36 extends from the cab 38 to a back end 40 of the pickup truck body 34. The pickup bed 36 has a floor panel 42 and a pair of side panels 44 each extending upwardly from the floor panel 42 and terminating in an upper edge 46. A bed cover 48 is coupled to the pickup truck body 34, and the bed cover 48 is positioned on and extends between the upper edges 46 of the pair of side panels 44. The bed cover 48 is positioned vertically spaced above the floor panel 42.

A bed solar panel 50 is attached to and faces upwardly from the bed cover 48 which is configured for converting solar radiation into electricity to charge the battery 20. The bed solar panel 50 also covers greater than 90% of a top side 54 of the bed cover 48. The bed cover 48 may be planar and rigid, and the bed cover 48 may be pivotably coupled to the pickup truck body 34 adjacent to the cab 38. Alternatively, the bed cover 48 may be flexible and be configured to be rolled up into a stored condition. The bed cover 48 is considered flexible if it includes a plurality of pivotally interconnected rigid portions such that it can be rolled up into the stored condition. If the bed cover 48 is flexible, the solar panel is also flexible such that it can be rolled up with the bed cover 48 into the stored condition. The bed solar panel 50 likewise can be comprised of interconnected rigid portions so that the solar panel may be rolled up.

One or more auxiliary batteries 52 is contained in the front end compartment 14 and is coupled to one or more of the front solar panel 22, the trailer solar panel 30, and the bed solar panel 50 to be charged. The auxiliary batteries 52 may operate as an emergency power source for the vehicle, in which case the system also comprises a control circuit capable of selectively connecting the auxiliary batteries 52 to an electrical system associated with the vehicle body 12. The vehicle body 12 would also include a power select input comprising a button, switch, touchscreen, or the like to connect the auxiliary batteries 52 to the electrical system.

In use, the front solar panel 22 automatically converts solar radiation into electricity for charging the battery 20 and the auxiliary batteries 52. In the embodiments with the trailer solar panel 30 or the bed solar panel 50, the trailer solar panel 30 or the bed solar panel 50 automatically also converts solar radiation into electricity for charging the battery 20 and the auxiliary batteries 52. In embodiments which use the auxiliary batteries 52 as an emergency power source, the power select input is actuated to connect the auxiliary batteries 52 to the electrical system.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electric vehicle solar power system comprising:
   a vehicle body including a front end compartment and a hood covering the front end compartment;
   an electric motor being operatively coupled to the vehicle body;
   a battery being electrically coupled to the electric motor;
   a front solar panel being attached to and facing upwardly from the hood, the front solar panel being electrically coupled to the battery, the front solar panel being configured for converting solar radiation into electricity, the front solar panel being configured for charging the battery;
   an auxiliary battery being electrically coupled to the front solar panel, the front solar panel being configured for charging the auxiliary battery; and
   a control circuit being configured to selectively electrically couple the auxiliary battery to the electric motor via a user input.

2. The system of claim 1, wherein the front solar panel covers greater than 90% of an upper surface of the hood.

3. The system of claim 1, wherein the auxiliary battery is one of a plurality of auxiliary batteries being electrically coupled to the front solar panel, the front solar panel being configured for charging the plurality of auxiliary batteries, the plurality of auxiliary batteries being contained in the front compartment, the control circuit being configured to selectively electrically couple the plurality of auxiliary batteries to the electric motor via the user input.

4. The system of claim 1, wherein the vehicle body defines a semitruck body, a trailer being coupled to the semitruck body, a trailer solar panel being coupled to and facing upwardly from the trailer, the trailer solar panel being electrically coupled to the battery and being configured for converting solar radiation into electricity to charge the battery.

5. The system of claim 4, wherein the trailer solar panel covers greater than 90% of a top surface of the trailer.

6. The system of claim 4, further comprising a plurality of auxiliary batteries being electrically coupled to one of each of the front solar panel and the trailer solar panel, the one of each of the front solar panel and the trailer solar panel being configured for charging the plurality of auxiliary batteries, the plurality of auxiliary batteries being contained in the front compartment.

7. The system of claim 1, further comprising:
   wherein the vehicle body defines a pickup truck body including a pickup bed, the pickup truck body including a cab being positioned between the front end compartment and the pickup bed, the pickup truck body having a back end, the pickup bed extending from the cab to the back end, the pickup bed having a floor panel and a pair of side panels, each of the side panels extending upwardly from the floor panel, each of the side panels having an upper edge;
   a bed cover being coupled to the pickup truck body, said bed cover being positioned on and extending between the upper edges of the pair of side panels, the bed covering being positioned vertically spaced above the floor panel; and a bed solar panel being attached to and facing upwardly from the bed cover, the bed solar panel being configured for converting solar radiation into electricity to charge the battery.

8. The system of claim 7, wherein the bed cover is planar and rigid.

9. The system of claim 8, wherein the bed cover is pivotably coupled to the pickup truck body adjacent to the cab.

10. The system of claim 7, wherein the bed cover is flexible and is configured to be rolled up into a stored condition.

11. The system of claim 7, wherein the bed solar panel covers greater than 90% of a top side of said bed cover.

12. The system of claim 7, further comprising a plurality of auxiliary batteries being electrically coupled to one of each of the front solar panel and the bed solar panel, the one of each of the front solar panel and the bed solar panel being configured for charging the plurality of auxiliary batteries, the plurality of auxiliary batteries being contained in the front compartment.

13. An electric vehicle solar power system comprising:
a vehicle body including a front end compartment and a hood covering the front end compartment;
an electric motor being operatively coupled to the vehicle body;
a battery being electrically coupled to the electric motor;
a front solar panel being attached to and facing upwardly from the hood, the front solar panel being electrically coupled to the battery, the front solar panel being configured for converting solar radiation into electricity, the front solar panel being configured for charging the battery, wherein the front solar panel covers greater than 90% of an upper surface of the hood;
wherein the vehicle body defines a pickup truck body including a pickup bed, the pickup truck body including a cab being positioned between the front end compartment and the pickup bed, the pickup truck body having a back end, the pickup bed extending from the cab to the back end, the pickup bed having a floor panel and a pair of side panels, each of the side panels extending upwardly from the floor panel, each of the side panels having an upper edge;
a bed cover being coupled to the pickup truck body, said bed cover being positioned on and extending between the upper edges of the pair of side panels, the bed covering being positioned vertically spaced above the floor panel;
a bed solar panel being attached to and facing upwardly from the bed cover, the bed solar panel being configured for converting solar radiation into electricity to charge the battery, wherein the bed solar panel covers greater than 90% of a top side of said bed cover;
a plurality of auxiliary batteries being electrically coupled to one of each of the front solar panel and the bed solar panel, the one of each of the front solar panel and the bed solar panel being configured for charging the plurality of auxiliary batteries, the plurality of auxiliary batteries being contained in the front compartment; and
a control circuit being configured to selectively electrically couple the plurality of auxiliary batteries to the electric motor via a user input.

14. The system of claim 13, wherein the bed cover is planar and rigid, wherein the bed cover is pivotably coupled to the pickup truck body adjacent to the cab.

15. The system of claim 13, wherein the bed cover is flexible and is configured to be rolled up into a stored condition.

\* \* \* \* \*